May 30, 1961 P. SCHAGEN ET AL 2,986,673

CIRCUIT ARRANGEMENTS INCLUDING CHARGE STORAGE TUBES AND TO CHARGE STORAGE TUBES

Filed Dec. 22, 1958 6 Sheets-Sheet 1

INVENTORS
PIETER SCHAGEN
BRIAN W. MANLEY

BY Frank R. Jifani

AGENT

INVENTORS
PIETER SCHAGEN
BRIAN W. MANLEY
BY
Frank R. Jifani
AGENT

INVENTOR.
PIETER SCHAGEN
BRIAN MANLEY
BY Frank R. Jifari
AGENT

INVENTOR.
PIETER SCHAGEN
BRIAN W. MANLEY
BY
Frank R. Jifani
AGENT

INVENTOR.
PIETER SCHAGEN
BRIAN W. MANLEY
BY
Frank R. Jifani
AGENT

INVENTOR.
PIETER SCHAGEN
BRIAN W. MANLEY
BY
Frank R. Jifari
AGENT 2,986,673

CIRCUIT ARRANGEMENTS INCLUDING CHARGE STORAGE TUBES AND TO CHARGE STORAGE TUBES

Pieter Schagen, Redhill, and Brian William Manley, Horley, England, assignors to North American Philips Company, Inc., New York, N.Y.

Filed Dec. 22, 1958, Ser. No. 782,280

Claims priority, application Great Britain Dec. 20, 1957

3 Claims. (Cl. 315—12)

This invention relates to circuit arrangements including charge storage tubes and also to charge storage tubes.

Charge storage tubes have an application in radar systems where it is an advantage to eliminate from the display echoes of a permanent nature, so that echoes from moving objects may be more clearly observed. The storage tube can act as a means of delaying the signal received during one radar scan so that it may be compared with that received during the next scan.

In such a system it is possible to employ two charge storage tubes and to write during a scanning period incoming signal information on one tube and read off from the other information written during the preceding frame. The read-off information is then compared with the incoming information and the difference signal supplied to the display device. Such an arrangement, however, has the disadvantage that two charge storage tubes with associated switching apparatus are required. It is an object of the present invention to provide improved means capable of providing signal difference information with the aid of a single charge storage tube.

According to one aspect of the present invention there is provided a circuit arrangement including a charge storage tube having an electron gun comprising a cathode electrode for producing one electron beam, an anode electrode and a target having a storage surface, said target being provided with a backing of an electrically conductive material constituting a signal plate, scanning means for effecting similar repetitive scans of the beam over a path on the storage surface, signal input means for applying to the cathode during scans input signals to cause negative excursions of the cathode potential while ensuring that the potential difference between the storage element being scanned and the cathode is less than the first cross-over potential of the material of the target thereby permitting negative charge to be deposited on the storage surface in accordance with the input signals, and an output circuit connected to the signal plate for deriving simultaneously with the deposition of negative charge on the storage surface output signal information corresponding to the deposition of negative charge. The first cross-over potential of the material of the target is the lower of the two values of electron energies expressed in volts at which the secondary emission coefficient of the material is unity. In the operation of such a circuit arrangement, output signl information can be derived simultaneously with the application to the tube of the input information. The output information obtained during the scan of any element will correspond to the negative charge deposited on that element and this in turn will depend on the amplitude of the input signal and the magnitude of the negative charge (if any) already deposited on that element; thus the output information will be a difference signal, namely the difference, or a function of the difference, between the input signal and the signal corresponding to the amount of charge, if any, present on the storage element being scanned.

According to a second aspect of the invention there is provided a circuit arrangement comprising a source in input signals derived by similar repetitive scans of a field effected in equal or substantially equal intervals of time, a charge storage tube having an electron gun comprising a cathode electrode for producing one electron beam, an anode electrode and a target having a storage surface, said target being provided with a backing of an electrically conductive material constituting a signal plate, scanning means for effecting similar repetitive scans of the beam over a path of the storage surface in periods equal or substantially equal to the said time intervals, input means for applying to the cathode during scans said input signals so as to cause negative excursions of the cathode potential while ensuring that the potential difference between the storage element being scanned and the cathode is less than the first cross-over potential of the material of the target thereby permiting negative charge to be deposited on the storage surface in accordance with the input signals, whereby in an initial scan the electron beam deposits on the storage surface negative electric charge in accordance with all of the input signals and in subsequent scans deposition of negative charge at any given storage element is prevented or reduced by the presence at the element of any previously deposited negative charge, and an output circuit connected to the signal plate for deriving simultaneously with the deposition of negative charge on the storage surface output signal information corresponding to the deposition of negative charge.

The source of signals may be provided by a radar receiver circuit adapted to produce signals corresponding to echoes from both stationary and moving bodies. Thus in a first scan of the storage surface a pattern of negative charge will be deposited corresponding to the stationary and moving bodies. Providing the beam current during the first scan is adequate to stabilise all storage elements at the corresponding cathode potential, then during subsequent scans deposition of charge due to the signal from a stationary body will be prevented, assuming in any scan the corresponding incoming signal is not greater in amplitude than that in the first scan, if the negative charge deposited in the initial scan does not leak away. This will be the case with a target of an insulating material when the cathode potential is constant in the absence of input signals.

Thus when the storage tube output signals are fed to a cathode ray display device in which scanning of the luminescent screen is effected in the same time as the scanning of the storage surface of the storage tube, after the first scan stationary bodies will not cause the screen to luminesce. However, in time the whole target will become insensitive because the negative charge deposited thereon due to signals from moving bodies may prevent deposition of further negative charge in accordance with signals from new moving bodies. To overcome this difficulty it is necessary to restore the storage surface by reducing the potential difference between the charged and uncharged storage elements to zero.

This restoration may be effected continuously or periodically after a number of scans of the target. A continuous restoration can be effected by applying during scanning a negative sawtooth voltage to the cathode or by allowing the charge deposited on the storage elements to leak partially away between scans. Target materials which can give rise to charge leakage are materials having a suitable finite electrical resistance. This resistance may be inherent or, in the case of a target of a photo-conductive material, it may be induced by exposing the photo-conductive material to radiation to which the material is sensitive. In the case of a photo-emissive target continuous charge leakage can be produced by removing electrons from the target by exposing the photo-emissive material to radiation to which it is sensitive.

It may be desirable to be able to display signals from stationary bodies on the display screen but with a brightness less than that due to signals from moving bodies. This may be achieved by arranging that in the output of the storage tube the signals corresponding to stationary bodies have an amplitude smaller than that of signals corresponding to the moving bodies. Stationary bodies can be made to produce reduced output signals by allowing the charge deposited on storage elements partially to leak away between scans in such manner that the potential difference between an element negatively charged by reason of an input signal and one not so charged is reduced between consecutive scans of that charged element as will be explained later more fully. This can be achieved by employing as the target material one having a suitable inherent finite resistance or a photo-conductive material.

The use of a material having a suitable inherent finite resistance has particular advantages and according to a further aspect of the invention there is provided a novel charge storage tube having a target of a material exhibiting a specific resistance lying between the limits $10^{13}$ and $10^{15}$ ohm-cm.

The manner in which the storage surface is scanned will, in general, depend on the nature of the scan in the display device. Thus if the latter scan is a single line repetitively scanned then a single line scan would be employed in the storage tube. For the case in which the scan of the display screen is made up of a number of consecutively scanned rectilinear paths, for example as in a P.P.I. display, then a scan in the form of a rectangular raster of parallel lines constituting a frame scan may be employed for the storage surface of the storage tube target.

In order that the invention may be readily carried into effect, it will now be described with reference to the accompanying drawing, in which.

A general description of the effect of electron bombardment of an insulated element of the surface of a target will first be described with reference to Figures 1 and 2 of the drawings.

When an electron strikes a surface it will penetrate to a depth that increases with its initial energy. In its path through the material it will give up energy in a series of collisions with atoms which may cause these atoms each to eject an electron. Some of these electrons will recombine before reaching the free surface of the material, others will have insufficient energy to cross the surface, but some will leave the material. The total number of electrons produced by collision is proportional to the energy of the impinging electron but, as this increases, so a larger proportion of the ejected electrons are produced at such depths in the material that few can escape.

When a beam of electrons from a cathode at zero volts strikes a surface, there will therefore be an electron current leaving the surface, which will be composed of liberated electrons together with a number of the impinging electrons which have been reflected or scattered back from the surface. This reverse current will be termed the secondary current.

Figure 1:
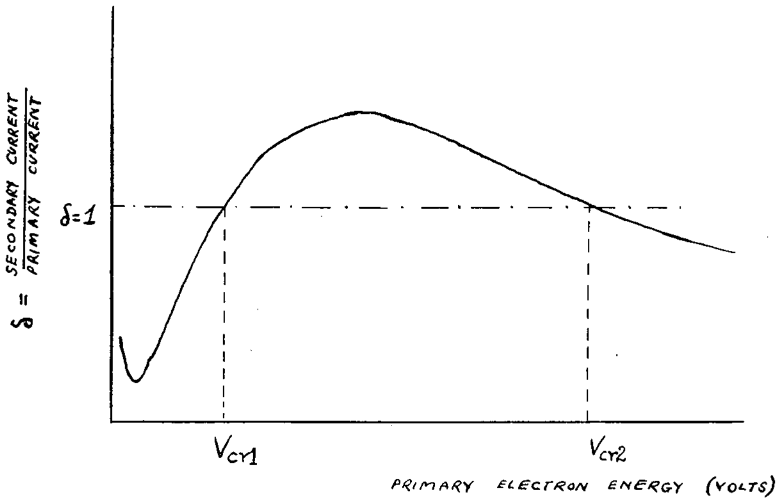
Figs. 1 and 2 are characteristic curves of the variation of the ratio of secondary current to primary current of a storage tube with the energy of primary electrons.
Figure 2:
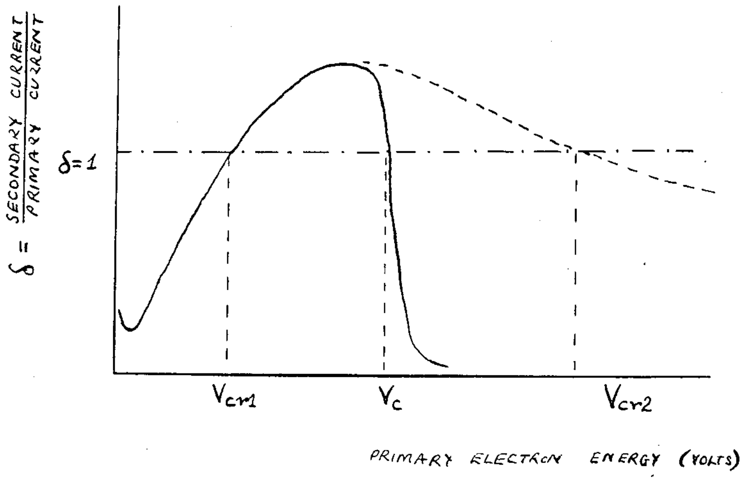

The characteristic curve showing how the ratio of secondary current to primary current varies with the energy of the primary electons is shown in Figure 1. The surface of an insulator will behave in this way only when all of the secondary current is drawn to a collector electrode having a potential more positive than the surface element of the target. If the collector has a potential $V_c$ then secondary electrons emitted when the potential of the surface element is higher than $V_c$ will not be drawn to the collector but will return to the target. In the operation of many storage tubes $V_c$ lies between $V_{cr1}$ and $V_{cr2}$ the two potentials at which the secondary emission coefficient $\Delta$ is unity and the effective secondary emission curve is then of the form shown in Figure 2. The "cut-off" at $V_c$ is not sharp because a few of the secondary electrons have sufficient energy to surmount a small retarding field between target surface and the collector electrode.

The most significant points on the secondary emission curves in the operation of storage tubes are the cross-over points $V_{cr1}$, $V_{cr2}$ and $V_c$ for which the ratio of collected secondary current to primary current is unity.

Figure 3:
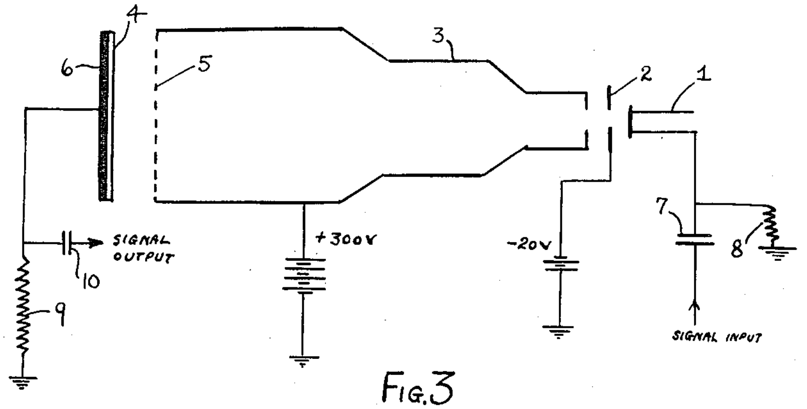
Fig. 3 is a circuit diagram of a storage tube system and diagrammatically illustrates the elements of a storage tube.

The potentials assumed by elements of the surface of an insulating target in a storage tube having the electrode assembly diagrammatically shown in Figure 3 will now be considered. The storage tube comprises a cathode 1, a control grid electrode 2, and a combined final and collector anode 3. The anode electrode 3 extends to adjacent the storage surface of an insulating target 4, terminating in a collector mesh 5. Suitable materials for the target are mica, magnesium oxide, calcium fluoride, magnesium fluoride and oxides of silicon. The target has a conductive backing 6 constituting a signal plate. Input signals developed across resistor 8 are fed to the cathode via capacitor 7, output signals being developed across resistor 9 of the output circuit and obtained via capacitor 10.

Before scanning with the electron beam the storage surface may be at any potential, but consider the case when the potential lies below $V_{cr1}$. An element of the storage surface now scanned by the electron beam will emit secondary electrons, but since the secondary emission coefficient is less than unity, the secondary current will be less than the primary current. There is thus a net gain of electrons by the storage element and its potential will become less positive. This process will continue while the beam impinges on the element until the potential has fallen to that of the cathode. No further electrons can then arrive on the element and it is said to be cathode potential stabilised.

Consider now the case when the potential of the storage element before scanning with the electron beam lies between $V_{cr1}$ and $V_c$. When the element is scanned by the beam the secondary electron current will be greater than the primary current, since the secondary emission coefficient is greater than unity. There is thus a net loss of electrons by the storage element and its potential will become more positive. The element will continue to go positive while the beam impinges upon it until the potential reaches a value a little greater than that of the collector $V_c$ when $\Delta$ has fallen to unity. The target is then said to be collector potential stabilised.

Figure 4:
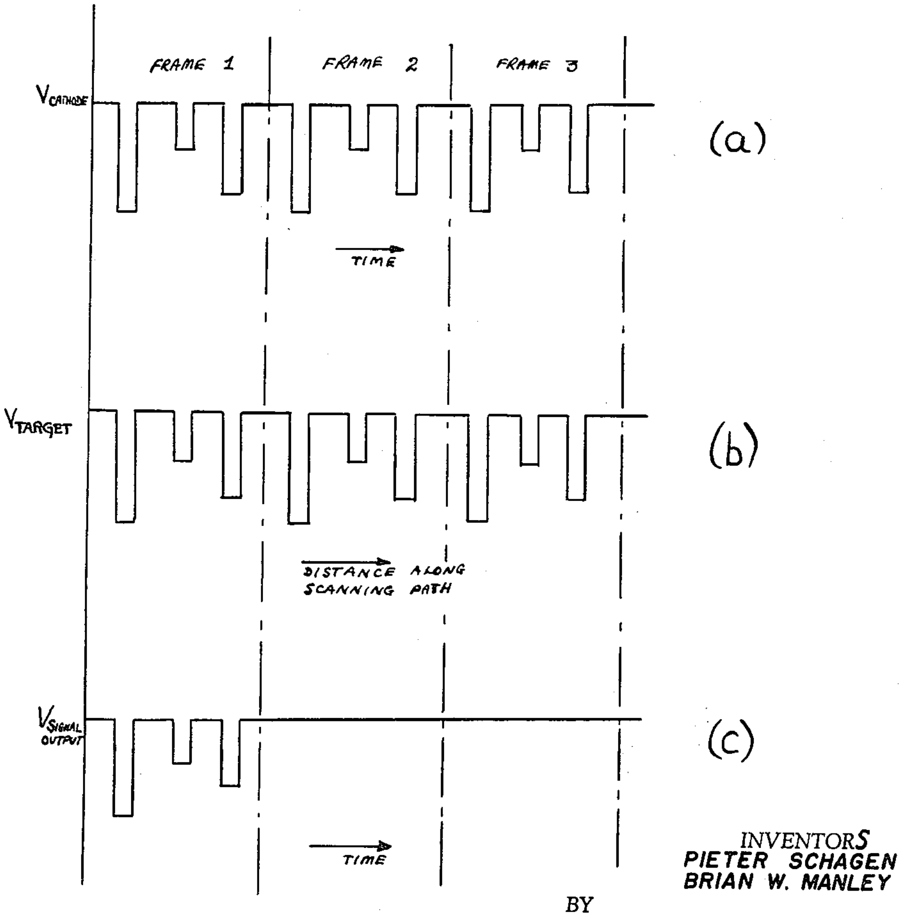
Fig. 4 illustrates typical cathode, target and signal output voltages for the tube of Fig. 3 for stationary object signals.

The operation of a circuit arrangement in accordance with the invention in which the storage tube target is an insulator will now be described with reference to Figures 3 and 4 of the drawings as employed in a radar display system. Figure 4 gives various voltage wave forms associated with the operation of the tube shown in Figure 3.

It may be mentioned first that it is not necessary to use the same form of scan in the storage tube as in the final display; it is only necessary that the frame scan time be the same in both storage tube and display and that all the lines in the scan be resolved on the storage tube target. Thus if a P.P.I. display is used it may be undesirable to use such a radial scan in the storage tube because of the high resolution needed towards the centre of the scan, and a rectangular scan would be preferred. Typical electrode potentials are shown in Figure 3.

Before writing starts it is assumed that the whole storage surface has been stabilised at cathode potential.

It will now be assumed that the radar system is scanning a field in which there are only stationary objects and that the echoes received from these do not vary in amplitude from scan to scan. The signals received during the first frame are applied to the cathode as negative pulses of a few volts amplitude (Figure 4*a*). Providing the beam current is adequate, then the storage elements scanned during the signals will be stabilised at the corresponding cathode potential (Figure 4*b*). During the first frame negative signals will appear at the target signal plate corresponding to the deposition of negative charge on the storage elements on first appearance of the fixed echoes (Figure 4*c*). During the second scan the same signals will be applied to the cathode, but now no further charge will be deposited on the storage elements since they are already stabilised to the potentials corresponding to this signal pattern; no signal due to these echoes will therefore appear at the target signal plate during this scan, or during any successive scan.

Figure 5:
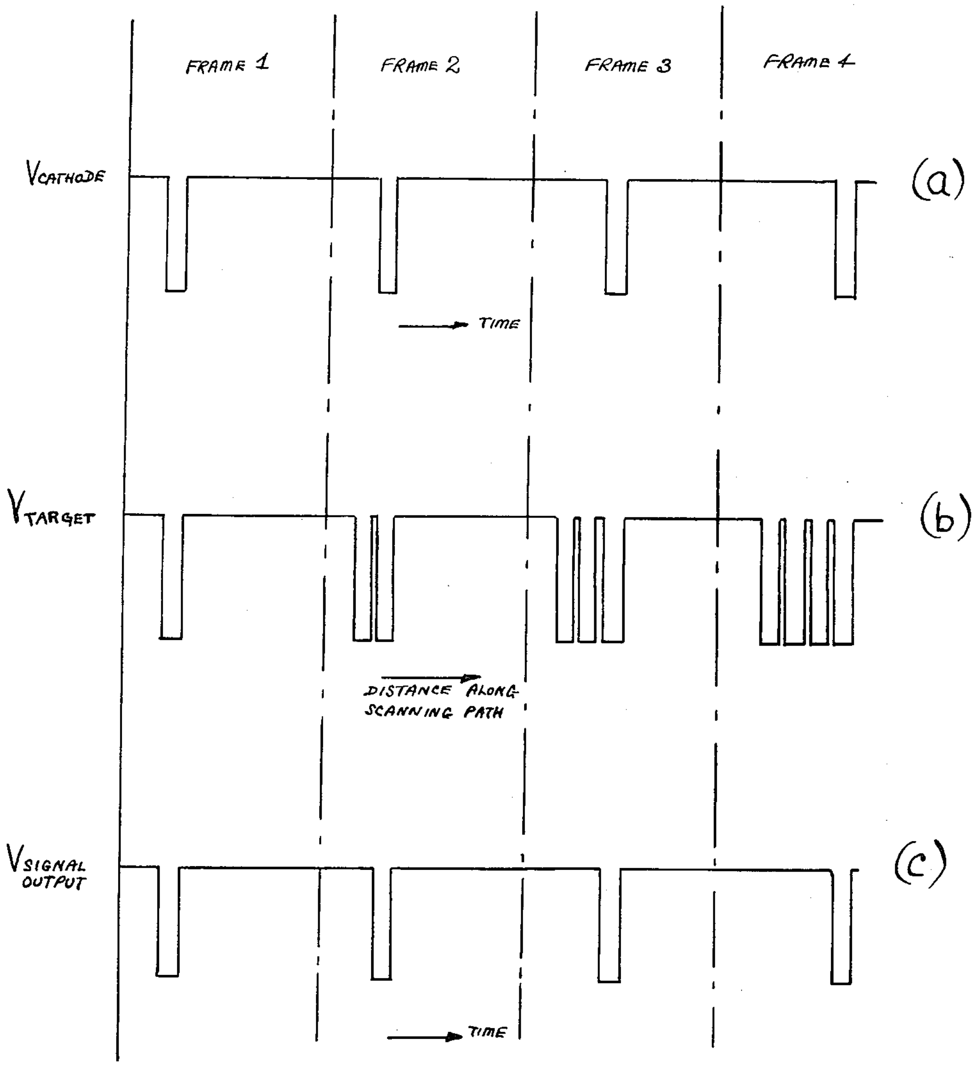
Fig. 5 illustrates typical cathode, target and signal output voltages for the tube of Fig. 3 for moving object signals.

It will now be assumed that echoes are received from a moving object. The corresponding cathode and storage surface potentials and the signal voltage during successive scans are shown respectively in Figures 5*a*, *b* and *c*. A signal will appear at the target signal plate only when a storage element is written for the first time, and once the area is stabilised to a potential equal to the amplitude of the maximum signal level, then no further signal can be obtained from this element. It is clear then that in time the whole storage surface will become insensitive and it must be restored by reducing the potential of the charge elements to the unmodulated cathode potenial. The various possible ways in which this might be done are now described.

It will be possible to use the target without restoration for a time depending upon the amount of incoming information. After this time the insensitive areas of the storage surface will be extensive and may obscure new echoes. The restoration may be done periodically by switching the cathode potential sufficiently negative during one scan that the secondary emission coefficient is greater than unity. The cathode and storage surface potentials and the signal voltages for this method are shown in Figures 6*a*, *b* and *c*.

During the restoration scan each storage element will be raised positive by an amount depending upon the beam current and upon the secondary emission coefficient Δ. This latter will be substantially constant for all storage elements. It may be necessary therefore to switch the cathode and grid potential during the scan to adjust the beam current to a suitable value. Since substantially the same amount of charge arrives on each storage element no signal will be obtained during the scan.

During the next scan, in which the storage surface is being restabilised at cathode potential, no signal will be observed for stationary objects, positive signals will appear from the previous positions of moving objects and negative signals corresponding to positions of moving objects during the current scan.

Figure 6:
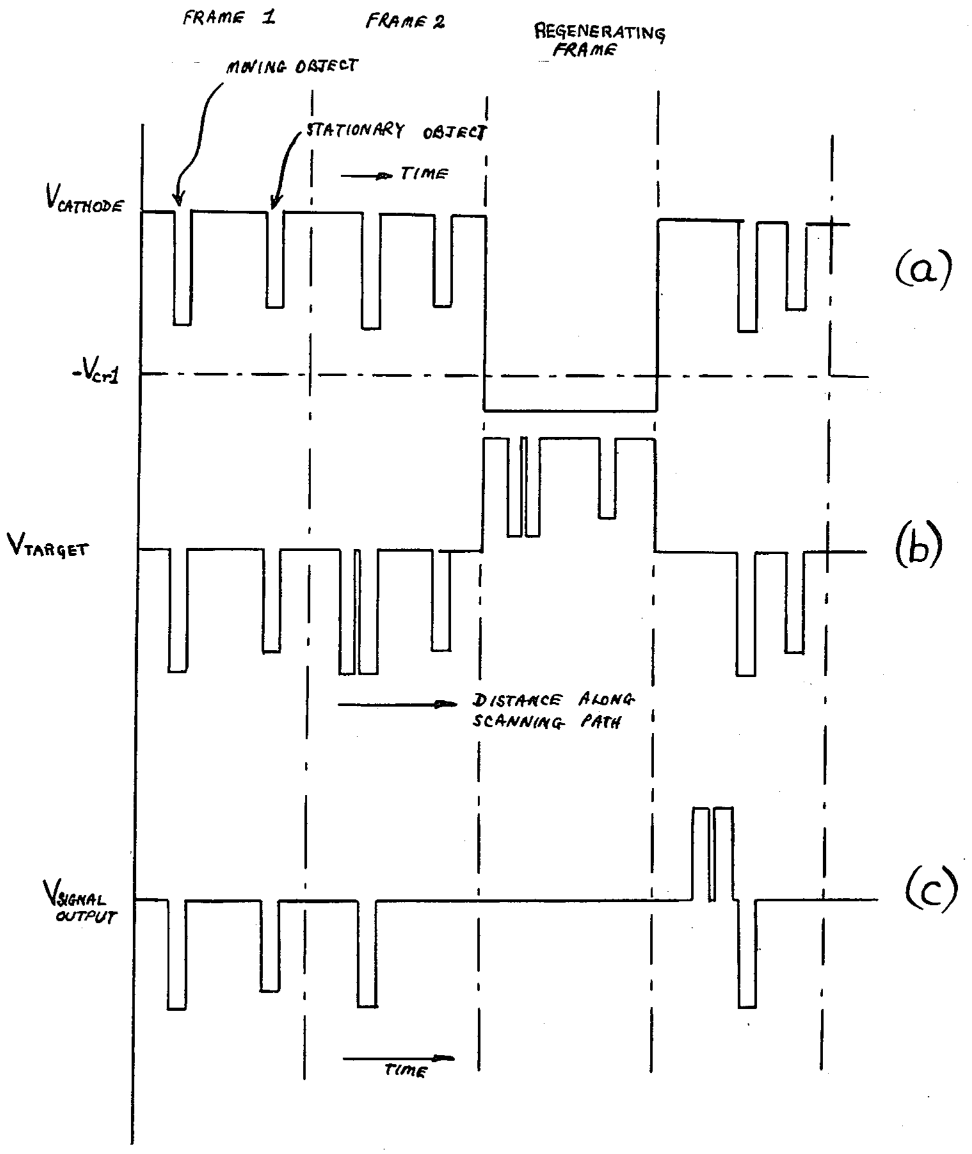
Fig. 6 illustrates the various voltages of the tube of Fig. 3 when one storage surface restoration system according to the invention is employed.

In Figure 6(*a*) no input signals are shown applied to the cathode during the restoration scan. They have been omitted in the interests of clarity. It is possible in practice to switch off the input signals during the restoration scan without causing any significant change in the potential pattern on the storage surface as represented by Figure 6(*b*) and in particular there will still be no output from the signal plate during this restoration scan.

The restoration of the storage surface is shown effected in the third scan only for the purpose of explanation of the operation of the tube and in practice such a scan will be effected after many scans, the actual number of which will depend on the amount of incoming information.

It is possible to restore the storage surface continuously by applying to the cathode of the storage tube a sawtooth waveform as shown in Figure 7*a*. This will have the effect of reducing the potential of the unwritten areas of the target towards that of the written areas. Thus an element of the storage surface stabilised at any −6 v. by the signal received from a moving object will be able to record a full signal again when the surrounding unwritten elements initially all zero volts are carried down to −6 v. by the sawtooth voltage. This restoration period will depend upon the incoming signal amplitude and the gradient of the sawtooth voltage applied to the cathode. For example, if this gradient was 2 volts per scan, then the restoration period for a 6 volt signal would be three scans. An element of the target stabilised at −6 v. by the signal received from a moving object will give rise to a positive signal at the target signal plate during the next scan equal in amplitude to the decrease in cathode potential between scans due to the sawtooth voltage. In the case above this positive signal at the target signal plate would have an amplitude of 2 volts.

An element of the storage surface stabilised at a negative potential by the signal received from a stationary object will give rise to a negative signal at the target signal plate during the initial stabilisation, but no further signal would be obtained from this element providing the amplitude of the echo remained constant from frame to frame.

In practice, in order to maintain the focus of the electron beam and to keep the beam current constant the potentials of the grid and anode must decrease at the same rate as that of the cathode. It is not strictly necessary to keep the beam current constant, but it should be kep at the minimum value adequate for restabilising target elements by one scan in order to keep the spot size as small as possible.

The maximum permissible negative excursion during the sawtooth will depend upon the maintenance of good focusing conditions of the electron beam at the edges of the storage surface. The effect of the potential of unwritten areas of the storage surface and of the target signal plate, which will remain at zero volts during the sawtooth, will be a defocusing of the beam at the edges of the unwritten area and a "pulling" of the beam towards unwritten areas. When this produces undesirable effects in the display, then the storage surface must be restabilised.

Figure 7:
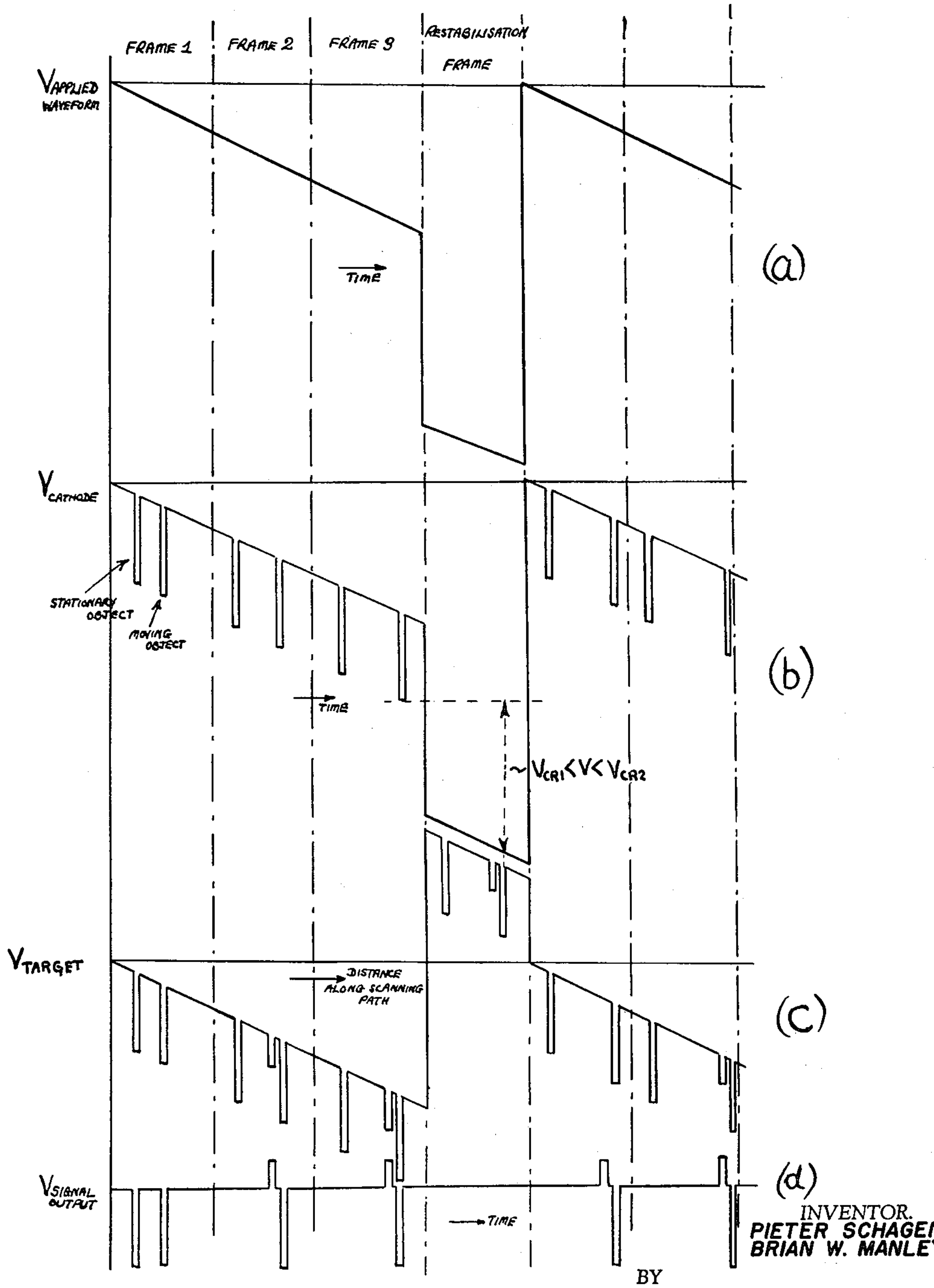
Fig. 7 illustrates the various voltages of the tube of Fig. 3 when another storage surface restoration system according to the invention is employed.

This restabilisation is effected by applying during one complete frame a further negative shift to the cathode of sufficient amplitude that the secondary emission coefficient, Δ, is greater than unity for all elements of the storage surface as shown in Figure 7(*b*). During the restabilisation scan, the beam current must be sufficient to raise all storage elements to a potential equal to or greater than zero volts (see Figure 7(*c*)). Suppose for example that the most negative storage element is at a potential of −100 volts before the start of the restabilisation scan. With a target of diameter 2 cm. and capacitance 600 $\mu/\mu$/f./cm.$^2$ recording a radar scan of 3 second period, then a beam current of 0.4 /$\mu$A. will be necessary to restabilise the element at zero volts during the restabilisation scan, assuming the energy of the electron striking the target to be such that the secondary emission coefficient Δ is 1.2.

The signal voltages which would result from operating the tube in this way are shown in Figure 7(*d*).

In Figure 7(*b*) no input signals are shown applied to the cathode during the restabilisation scan. They have been omitted in the interests of clarity. It is possible in practice to switch off the input signals during the restabilisation scan without causing any significant change in the potential pattern on the storage surface as represented by Figure 7(*c*) and in particular there will still be no output from the signal plate during this restabilisation scan.

The restabilisation scan is shown as being effected after only three scans merely for the purpose of the explanation.

During restabilisation frame instead of depositing substantially the same amount of positive charge over the whole storage surface thus maintaining the potential pattern, the storage surface may be stabilised at the collector potential. In this case, however, in the next frame negative signals corresponding to both stationary and moving bodies will be produced at the signal plate.

The restoration of written elements of the storage surface whilst avoiding cathode switching can be effected by using for the target of the tube a material having a suitable finite resistance and applying to the signal plate a potential equal to or positive with respect to the cathode and preferably less than the first cross-over potential of the material of the target. In this case restoration is achieved by charge leakage through the target material.

Figure 8:
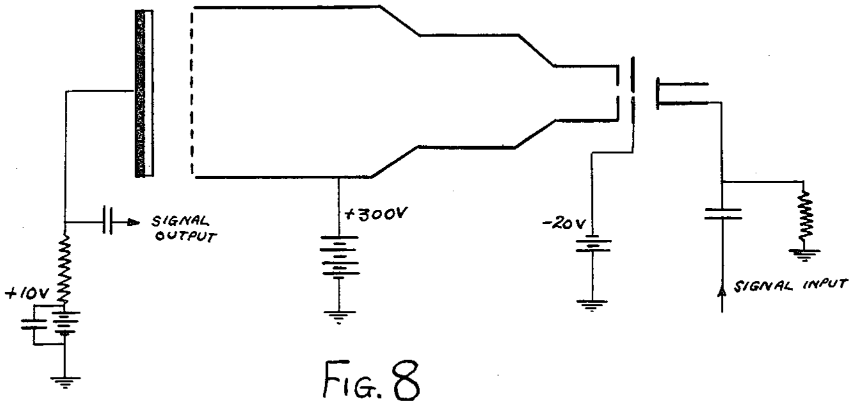
Fig. 8 illustrates a variation in the circuit arrangement of Fig. 3.
Figure 9:
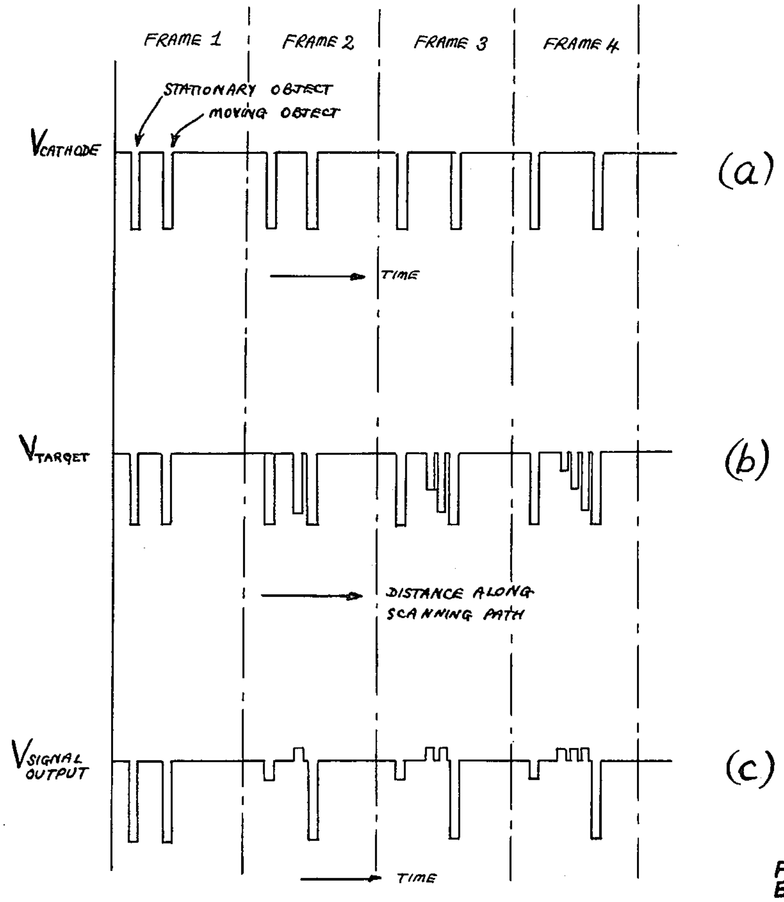
Fig. 9 illustrates the various voltages associated with the operation of the arrangement of Fig. 8.

Typical electrode voltages for a charge storage tube employing such a target are shown in Figure 8 of the drawings and Figure 9 of the drawings shows various voltage waveforms associated with the operation of the arrangement shown in Figure 8.

When no signal is applied to the cathode, the storage surface of the target will be stabilised at substantially zero volts. There will then be a potential difference of substantially 10 volts between the storage surface and the backing electrode. When a signal of, say, —6 volt amplitude is applied to the cathode, then corresponding storage elements of the target surface are stabilised at this potential and the potential difference across the target in these areas is 16 volts. The rate of rise of the potential of storage element will depend upon the potential difference across the element and the RC time of the target material. For example supposing the RC time of the target is such that the potential of an unwritten storage element increases 2 volts between scans due to leakage, then the potential of a written element stabilised at —6 volts will rise in the same proportion by 3.2 volts. Written areas thus tend to charge positive more rapidly than unwritten areas. For this reason there will be at each scan a small negative signal from a storage element corresponding to a stationary object (see Figure 9(*c*). The amplitude will be proportional to the difference in voltage rise during a scan of written and unwritten elements. The rate of rise of the potential of a storage element and hence the time required for restoration of written elements can be varied by adjusting the signal plate potential. Elements charged in one scan to —6 volts due to a signal from a moving body will give rise to a positive signal of 2 volts amplitude in the next scan (as shown in Figure 9*c*) and these elements will continue to give rise to positive signals in subsequent scans until they are fully restored, that is when the potential of the elements reaches cathode potential.

In order to obtain complete restoration of a storage element stabilised at —6 volts by the signal received from a moving target, in a period of say 60 seconds and using the electrode potentials shown in Figure 8, a time constant of about 150 seconds would be needed. Assuming a dielectric constant of 5, the necessary resistivity of the target material would be about $10^{14}$ ohm-cm. Suitable limits to the target resistivity to give a wide control of restoration time are $10^{13}$ to $10^{15}$ ohm-cm. As the target material use can be made of certain glasses and sulphides of lead.

In the descriptions given above referring to Figures 4, 5 and 6, Figure 7 and Figure 9, it has been assumed that the beam current is adequate to stabilise the storage elements at cathode potential in one scan. If the beam current has not such a sufficient value the result will be that output signals will be obtained corresponding to stationary bodies for the number of scans required for the corresponding storage elements to be stabilised.

A further method of effecting the restoration of written areas whilst avoiding cathode switching is to employ for the target a photo-conductive material, such as evaporated lead oxide suitably treated, and apply to the signal plate a potential equal to or positive with respect to the cathode potential, preferably less than the first cross-over potential of the target material. As in the case of the target material having a finite resistance, restoration is achieved by charge leakage through the target material. The circuit arrangement may be as in Figure 8 save in the substitution of target materials. The charge leakage may be produced by uniformly exposing the target material through the signal plate to radiation to which the material is sensitive and in this case the signal plate must be transparent to the radiation. By varying the exposure of the target, the rate of restoration of storage elements may be varied. The various voltage wave forms obtained with a photo-conductive target will be the same as those shown in Figure 9.

A still further method of effecting restoration of the storage surface of the target is to use for the target a photo-emissive material such as a mosaic of barium, silver oxide or caesium oxide. In this case the arrangement may be as shown in Figure 3 with the substitution of the target materials. By uniformly exposing the target to radiation to which it is sensitive a steady leakage of electrons to the collector mesh 5 will be produced, this leakage constituting the restoration current. It will be necessary, of course, to employ a signal plate backing which transmits the radiation. In the use of such a target material the output signals will be the same as in the case of a target of finite resistivity as shown in Figure 9 save in that there will be no reduced output from stationary bodies in the second and subsequent scans.

What we claim is:

1. A circuit for restoring the storage surface of a charge storage tube of the type having an electron gun with a cathode for producing an electron beam, an anode electrode, and a target having a storage surface and a backing of electrically conductive material, said circuit comprising scanning means for effecting similar repetitive scans of said electron beam over a path on said storage surface, signal input circuit means connected to said cathode, signal output circut means connected to said backing, and means for continuously reducing the potential difference between charged and uncharged elements of said storage surface over a number of said scans of said storage surface, said last-mentioned means comprising means applying a voltage having a sawtooth shaped waveform to said cathode.

2. A circuit for restoring the storage surface of a charge storage tube of the type having an electron gun with a cathode for producing an electron beam, an anode electrode, and a target having a storage surface and a backing of electrically conductive material, said circuit comprising scanning means for effecting similar repetitive scans of said electron beam over a path on said storage surface, signal input means connected to said cathode to cause negative excursions of the potential of said cathode while ensuring that the potential difference between the storage element of said storage surface being scanned and said cathode is less than the first crossover potential of the material of said target, output circuit means connected to said backing, and means for continuously reducing the potential difference between charged and uncharged elements of said storage surface over a number of said scans of said storage surface.

3. A circuit for restoring the storage surface of a charge storage tube of the type having an electron gun with a cathode for producing an electron beam, an anode electrode, and a target having a storage surface and a backing of electrically conductive material, said circuit comprising scanning means for effecting similar repetitive scans of said electron beam over a path on said storage surface, signal input means connected to said cathode to cause negative excursions of the potential of said cathode while ensuring that the potential difference between the storage element of said storage surface being scanned and said cathode is less than the first crossover potential of the material of said target, output circuit means connected to said backing, and means connected to said cathode for continuously reducing the potential of said cathode over a number of scans of said storage surface, whereby the potential difference between charged and uncharged elements of said storage surface is continuously reduced.

References Cited in the file of this patent

UNITED STATES PATENTS

| | | |
|---|---|---|
| 2,451,005 | Weimer | Oct. 12, 1948 |
| 2,600,255 | McConnell | June 10, 1952 |
| 2,666,137 | Cunningham et al. | Jan. 12, 1954 |